US007684088B2

(12) United States Patent
Jordan et al.

(10) Patent No.: US 7,684,088 B2
(45) Date of Patent: Mar. 23, 2010

(54) METHOD FOR PREVENTING COUNTERFEITING OR ALTERATION OF A PRINTED OR ENGRAVED SURFACE

(75) Inventors: Frederic Jordan, Les Paccots (CH); Roland Meylan, Pully (CH); Martin Kutter, Puidoux-Village (CH)

(73) Assignee: Alpvision S.A., Vevey (CH)

( * ) Notice: Subject to any disclaimer, the term of this patent is extended or adjusted under 35 U.S.C. 154(b) by 1176 days.

(21) Appl. No.: 10/380,914

(22) PCT Filed: Sep. 17, 2001

(86) PCT No.: PCT/CH01/00560

§ 371 (c)(1), (2), (4) Date: Aug. 4, 2003

(87) PCT Pub. No.: WO02/25599

PCT Pub. Date: Mar. 28, 2002

(65) Prior Publication Data

US 2004/0013285 A1 Jan. 22, 2004

(51) Int. Cl.
*H04N 1/40* (2006.01)
*G06K 9/00* (2006.01)

(52) U.S. Cl. ........................ 358/3.28; 358/1.9; 358/2.1; 358/3.29; 358/3.01; 358/3.3; 358/520; 358/540; 358/426.07; 358/426.13; 358/426.14; 382/100; 382/135; 382/232; 382/284; 382/248; 283/37; 283/39; 283/133

(58) Field of Classification Search ................ 358/3.29, 358/3.3, 3.31, 3.32, 3.28, 1.9, 2.1, 3.01, 520, 358/540, 426.07, 426.14, 426.13; 382/100, 382/135, 300, 232, 284, 248, 250, 195, 260; 902/7, 28; 713/176, 162; 283/113, 37, 39
See application file for complete search history.

(56) References Cited

U.S. PATENT DOCUMENTS 3,984,624 A 10/1976 Waggener (Continued)

FOREIGN PATENT DOCUMENTS

EP 0 298 691 A2 1/1989

(Continued)

OTHER PUBLICATIONS

R. G. Van Schyndel et al., "A Digital Watermark", Proceedings of ICIP, 1994, (3 pages).

(Continued)

*Primary Examiner*—David K Moore
*Assistant Examiner*—Steven Kau
(74) *Attorney, Agent, or Firm*—DLA Piper LLP US

(57) ABSTRACT

The invention describes a process to prevent counterfeiting or alteration of a printed or engraved surface, characterized by the incorporation of a signature of the form of a digital mark into parts or the entire document, and in particular a digital mark technology to hide information in an invisible way through over-printing by using a method called asymmetric amplitude modulation. This method can be applied to any type of printed material such paper, packaging, or any other surface. Visible information can also be printed over the digital mark. As an application example, applied to a paper document the digital mark can be used to guarantee the document authenticity, as it would be destroyed by a copy process.

14 Claims, 4 Drawing Sheets

U.S. PATENT DOCUMENTS

| | | | | |
|---|---|---|---|---|
| 4,237,484 | A | 12/1980 | Brown et al. | |
| 4,495,526 | A | 1/1985 | Baranoff-Rossine | |
| 5,091,966 | A | 2/1992 | Bloomberg et al. | |
| 5,103,459 | A | 4/1992 | Gilhousen et al. | |
| 5,257,119 | A | 10/1993 | Funada et al. | |
| 5,315,098 | A * | 5/1994 | Tow | 235/494 |
| 5,363,202 | A | 11/1994 | Udagawa et al. | |
| 5,421,869 | A * | 6/1995 | Gundjian et al. | 106/31.19 |
| 5,488,664 | A | 1/1996 | Shamir | |
| 5,530,751 | A | 6/1996 | Morris | |
| 5,754,674 | A | 5/1998 | Ott et al. | |
| 5,872,834 | A | 2/1999 | Teitelbaum | |
| 5,946,414 | A | 8/1999 | Cass et al. | |
| 5,960,081 | A | 9/1999 | Vynne et al. | |
| 6,039,257 | A * | 3/2000 | Berson et al. | 235/468 |
| 6,076,738 | A | 6/2000 | Bloomberg et al. | |
| 6,104,812 | A | 8/2000 | Koltai et al. | |
| 6,166,750 | A | 12/2000 | Negishi | |
| 6,289,108 | B1 | 9/2001 | Rhoads | |
| 6,343,138 | B1 | 1/2002 | Rhoads | |
| 6,345,104 | B1 * | 2/2002 | Rhoads | 382/100 |
| 6,351,815 | B1 * | 2/2002 | Adams | 726/32 |
| 6,404,898 | B1 | 6/2002 | Rhoads | |
| 6,421,145 | B1 * | 7/2002 | Kurita et al. | 358/448 |
| 6,442,555 | B1 * | 8/2002 | Shmueli et al. | 707/101 |
| 6,542,629 | B1 * | 4/2003 | Wu et al. | 382/135 |
| 6,546,114 | B1 * | 4/2003 | Venkatesan et al. | 382/100 |
| 6,614,914 | B1 * | 9/2003 | Rhoads et al. | 382/100 |
| 6,708,894 | B2 * | 3/2004 | Mazaika | 235/494 |
| 6,731,776 | B1 * | 5/2004 | Fujiwara | 382/100 |
| 6,750,902 | B1 * | 6/2004 | Steinberg et al. | 348/211.3 |
| 6,754,377 | B2 | 6/2004 | Rhoads | |
| 6,988,202 | B1 | 1/2006 | Rhoads et al. | |
| 7,068,811 | B2 | 6/2006 | Powell et al. | |
| 7,076,084 | B2 | 7/2006 | Davis et al. | |
| 7,116,781 | B2 | 10/2006 | Rhoads | |
| 7,171,018 | B2 | 1/2007 | Rhoads et al. | |
| 7,171,020 | B2 | 1/2007 | Rhoads et al. | |
| 7,280,672 | B2 | 10/2007 | Powell et al. | |
| 7,310,168 | B2 * | 12/2007 | Trelewicz et al. | 358/3.11 |
| 7,412,074 | B2 | 8/2008 | Powell et al. | |
| 7,424,132 | B2 | 9/2008 | Rhoads | |
| 2003/0063318 | A1 * | 4/2003 | Trelewicz et al. | 358/3.06 |

FOREIGN PATENT DOCUMENTS

| | | | |
|---|---|---|---|
| EP | 0 372 601 | A1 | 6/1990 |
| EP | 0 493 091 | A1 | 7/1992 |
| EP | 0 762 417 | | 3/1997 |
| EP | 0 961 239 | | 12/1999 |
| EP | 1 003 324 | A2 | 5/2000 |
| EP | 1 137251 | A2 | 9/2001 |
| EP | 1 389 011 | A2 | 2/2004 |
| GB | 2217258 | | 10/1989 |
| WO | WO 89/08915 | | 9/1989 |

OTHER PUBLICATIONS

A.Z. Tirkel et al., “Electronic Watermark”, Digital Computing, Technology and Applications (DICTA ’93), pp. 666-673, Macquarie University, Sidney (1993).

Yasuhiro Nakamura et al, “A Unified Coding Method of Dithered Image and Text Data Using Micropatterns”, Electronics and Communications in Japan, Part 1, vol. 42, No. 4, pp. 50-56 (1989).

Kiyoshi Tanaka et al., “A Digital Signature Scheme on a Document for MH Facsimile Transmission”, Electronics and Communications in Japan, Part 1, vol. 74, No. 8, pp. 30-37 (1991).

Kiyoshi Tanaka et al., “Embedding the Attribute Information into a Dithered Image”, Systems and Computers in Japan, vol. 21, No. 7, pp. 43-50 (1990).

Kazuhiko Hara et al., “An Improved Method of Embedding Data into Pictures by Modulo Masking”, IEEE Transactions on Communications, vol. 36, No. 3, pp. 315-331 (Mar. 1988).

Naohisa Komatsu et al., “A Proposal on Digital Watermark in Document Image Communication and Its Applciation to Realizing a Signature”, Electronics and Communications in Japan, Part 1, vol. 73, No. 5, pp. 22-33 (1990).

Wolfram Szepanski, “A Signal Theoretic Method for Creating Forgery-Proof Documents for Automatic Verification”, 1979 Carnahan Conference on Crime Countermeasures, University of Kentucky, Lexington, Kentucky—May 16-18, 1979, pp. 101-109.

Deepa Kundur et al., “Digital Watermarking for Telltale Tamper Proofing and Authentication”, Proceedings of the IEEE, vol. 87, No. 7, pp. 1167-1180 (Jul. 1999).

Kutter, et al., “Digital watermarking of color images using amplitude modulation”, Journal of Electronic Imaging, vol. 7, No. 2, pp. 326-332, 1998, (Abstract).

Pereira et al. “Optimized wavelet domain watermark embedding strategy using linear programming” (Wavelet Applications VII, part of SPIE AeroSense 2000, Orlando, Florida, Apr. 26-28, 2000, Szu et al. Conference Chairmen).

Kutter, “Watermarking resisting to translation, rotation, and scaling”, Proceedings of SPIE International Symposium on Voice, Video, and Data Communications, Nov. 1998.

* cited by examiner

METHOD FOR PREVENTING COUNTERFEITING OR ALTERATION OF A PRINTED OR ENGRAVED SURFACE

TECHNICAL FIELD

The present invention proposes a method for preventing counterfeiting or alteration of a printed or engraved surface.

STATE OF THE ART

Common systems for the prevention of counterfeiting or alteration of printed or engraved documents can be grouped as follows:

Holograms, printing of special motifs

Printing with special inks

Codes using invisible inks

Systems using a digital chip

Holograms, special motifs and other decorative features are difficult to reproduce because they require special equipment. They were specially designed to interfere with traditional copy systems so that the copy features significant visual differences from the original. They can be verified through visual inspection without the help of particular devices but have the drawback of being expensive, sufficiently known to be reproduced by counterfeiting experts, and their visual appearance disturbs the aesthetic of the protected products (for example packaging of cosmetics). The fact that these security features are visible also contributes to their limited efficiency because they can easily be identified by a counterfeiter and copied or physically removed.

Printing processes with special inks exploit particular chemical characteristics of the ink to provide determined reactions for given stimulations. As an example, fluorescent ink becomes very shiny when exposed to light with a particular wavelength. Some inks are invisible under natural light, other ink change their color depending on their viewing angle or temperature (and can be revealed by heating the paper with a finger) etc. The common point of special inks is their high price and the need to modify the industrial production chain for their usage, (for example the introduction of an additional plate in offset printing). Although being more robust against counterfeiting than the previous group, it is also possible for a counterfeiter to reproduce the effects of the inks and even verify the quality of the counterfeits by comparing them to the original if he is in possession of the appropriate device to make the ink react.

Printed codes using invisible ink are different from the previous groups in that they can carry digital information. The information can for example represent numbers, characters, barcodes, or 2D codes. In addition to the high price, these systems have two major disadvantages. Firstly, due to the nature of the codes used, it is localized in a specific part of the document or packaging and can therefore easily be destroyed without altering the entire surface. Secondly, the codes are easily identifiable anti-copy features due to their geometrical characteristics, such as bars, geometrical figures, and characters. This makes the job of finding and reproducing the ink for a counterfeiter much easier. In addition, if a counterfeiter is able to reproduce the ink, then he has ipso facto also the means to reproduce the code.

At last, systems based on memory or on-board processors have the disadvantage of being very expensive, not visually pleasing, and localized. Their main application serves to secure communication/access, or dynamically store information to distinguish an original from a copy.

One goal of the present invention is to remedy the weaknesses of the known processes to prevent counterfeiting or alteration of printed or engraved documents through a digital approach.

For this, the present invention addresses a process to prevent counterfeiting or alteration of a printed or engraved surface by inserting a digital mark into parts or the entire document.

Digital marking technologies, also known by the name digital watermarks, are methods by which information can be hidden in digital multimedia, such as music, video, images, and documents, in an imperceptible and robust way. The hidden information is called signature. This signature can for example represent a number, a name, or even an image. After protecting multimedia data with a digital watermark we refer to the protected data as signed image, signed video, etc.

Until today, digital watermarking methods were only used with the goal of retrieving a signature from an eventual copy to prove the origin of the data.

"Hiding" carries a very specific meaning in this context: for example in the case of an image, the color values of certain pixels would be changed during the hiding process, for music the sound would be slightly changed from time to time.

"Imperceptible" means that the modifications introduced during the hiding process are such that it is not possible for a human to distinguish the original from the signed data with its own senses. As an example, a signed image must have the exact same visual appearance as the original image, a piece of signed music sounds absolutely normal, and the same applies to video or any other data. The problem consists in deriving a process allowing a computer to detect the hidden information, while it is not perceptible by our senses. There exist also applications in which a visible mark is acceptable or even desirable. This allows for increased robustness and a visual verification of the inserted mark. The principle here is to design a visible mark having a non-disturbing appearance.

"Robustness" of a digital mark means that it should be possible to retrieve the embedded information after any modification of the signed data. Taking the example of an image, it should be possible to compress, print and scan, and rotate the signed image without losing the signature.

Numerous publications were made in the past covering different technologies to hide a mark in images, video, or audio signals. With respect to the images, the methods can be grouped according the technological approach used for marking: some apply modifications directly in the spatial domain (see for example [1] M. Kutter, F. Jordan, F. Bossen, "Digital watermaking of color images using amplitude modulation", *Journal of Electronic Imaging*, vol. 7, n° 2, pp. 326-332, April 1998.), others apply modification in a transformation domain (for example the frequency domain), or intermediate domains such as wavelets (see [2] Shelby Pereira, Sviatoslav Voloshynovskiy and Thierry Pun, Optimized wavelet domain watermark embedding strategy using linear programming, In Harold H. Szu and Martin Vetterli eds., *Wavelet Applications VII* (*part of SPIE AeroSense* 2000), Orlando, Fla. USA, Apr. 26-28, 2000.).

These methods can also be used to mark video after some slight adaptations. Other methods specifically designed for video also exist and often work in advanced transformation domains, such as 3D sub-bands, or motion vectors (for examples. see [3] U.S. Pat. No. 5,960,081, Video watermarking using motion vectors and [4] European patent application EP 0762417 A2, Video watermarking in the compressed domain).

Until today and as already mentioned, digital watermarking methods were used to retrieve a signature from a suspected copy with the goal of identifying the origin of the copy thanks to the presence of the watermark which can be retrieved on the copy. In all cases, this implies the usage of a robust watermark.

In the method of the present invention, the goal of inserting a digital mark on a surface is different because the presence of the mark serves to prevent counterfeiting or altering the concerned surface. In other words, the presence of the mark proves that the surface is authentic, and the absence of the mark indicates that it is a copy or that the surface was altered. In the case where the mark is used to authenticate the surface relatively to copies, the robustness of the digital mark must be reduced such that a copy of the surface results in a failure of the detection of the mark. We refer to these types of marks as "fragile". A typical application of fragile marks is the protection of valuable papers, such as banknotes, against counterfeiting. The mark may be both robust and fragile in the cases where it is inserted in order to detect alteration of parts or the entire document.

The present invention simultaneously encompasses features that are only present in an isolated manner in the known systems destined to prevent counterfeiting or alteration of printed or engraved documents mentioned above:

Invisibility

The mark is printed using a combination of color and printing resolutions such that it is not visible by the naked eye. This for example allows the protection of a packaging without visually altering the graphical design, a very important requirement for marketing reasons.

Non-localized

The mark can cover the entire surface of a printed document. Hence, it is not possible to erase it without altering the entire document, for example through scratching the surface. In practice, this property allows to avoid gray markets, that is, reselling of products by non-authorized distributors. In fact, malicious distributors often erase codes identifying their resellers (for instance invisible 2D codes) through milling the surface of the packaging where the code was applied.

Price

The mark is printed using traditional printing systems. With respect to industrial printing (offset, etc.), the mark fully integrates into the production process and does not introduce additional costs. With respect to personal printing (inkjet, laser, etc.), the technology is fully compliant with common commercially available printers. In both cases, the mark is read using a standard digital scanner. The low cost opens new markets. For industrial printing this includes among others packaging of luxury products and pharmaceutics, certificates, checks, and tickets. For personal printing, the digital mark allows anybody owning standard equipment to create and verify secured and personalized documents. As an example, physicians can hide the name of the medication on the prescription paper. It is also possible to program a printer so that it hides a digital mark on each printed document indicating the printing date and user.

Information Storage

In addition to authenticating the original, the mark contains digital information (typically tens of bits per square centimeter) encoded and decoded using a digital key. In practice, this storage for example helps to secure information printed in visible text (and therefore prone to being modified). With the mark it is possible to detect any modification of the text on the document by encoding the same information in the mark (date, amount, identity, etc.). One application addresses contracts where we want to be sure of the date. A different example is for banknotes where the serial number can be hidden in the mark making it impossible to forge bills with different serials numbers because the counterfeiter would need to create for each bill the corresponding mark.

Key Dependent Encoding and Decoding

To create and read a mark, the same key has to be used. By controlling access to the key one can control when and by whom a mark is created and read. This is essential because it significantly complicates forging a mark by a counterfeiter (the easiest approach is still copying an existing mark). In addition, a counterfeiter is not able to verify the quality of a counterfeit because he does not know the key used to create the original mark. The security of the system is therefore higher than for example for systems printing information using invisible ultraviolet ink where the counterfeiter can easily verify and therefore enhance the counterfeits.

Difficult to Identify Visually

Even when using special devices (filters, microscopes) it is difficult to identify a mark because it has a visual appearance that is similar to the paper grain. The mark has no simple geometrical characteristics and is meaningless for a detection program without the appropriate key. This is a crucial feature for marks on all value paper subject to a thorough analysis by counterfeiters.

Difficult to Copy

The use of certain colors (e.g. yellow on a white paper) and high-resolution printing (e.g. 1200 dpi) makes it very difficult or impossible to copy the mark on classical copy equipment.

Digital methods usually hide marks by slightly increasing or decreasing the color intensities of certain points, which means that certain pixels are brightened and others darkened, as shown in FIG. 1. The curve in this figure shows the luminance variations of the pixels along the X-axis for a fixed position on the Y-axis. The four peaks illustrate the effect of a symmetric modulation of this signal through local increase and decrease of the luminance.

There exist certain cases where a symmetric modulation is not possible for either mathematical reasons (e.g. image to mark is entirely white or black) or practical reasons (related to the printing technology).

The present invention proposes to asymmetrically modulate the pixel colors. FIG. 2 shows an example of an asymmetric modulation obtained by darkening the color of certain pixels. The modulation can be positive or negative, depending on whether color is added or removed. The curve again shows the luminance variations of the pixels along the X-axis for a fixed position on the Y-axis. The two peaks illustrate the effect of an asymmetric modulation, obtained by only reducing the luminance. FIG. 3 gives some examples of digital marks.

Thus another object of the present invention proposes a process to hide and/or retrieve a digital mark, characterized by using an asymmetric modulation of the amplitude of a visible or invisible luminous component.

DETAILED DESCRIPTION OF INVENTION

The following description is given as an example and refers to the figures in the annex:

Figure 1:
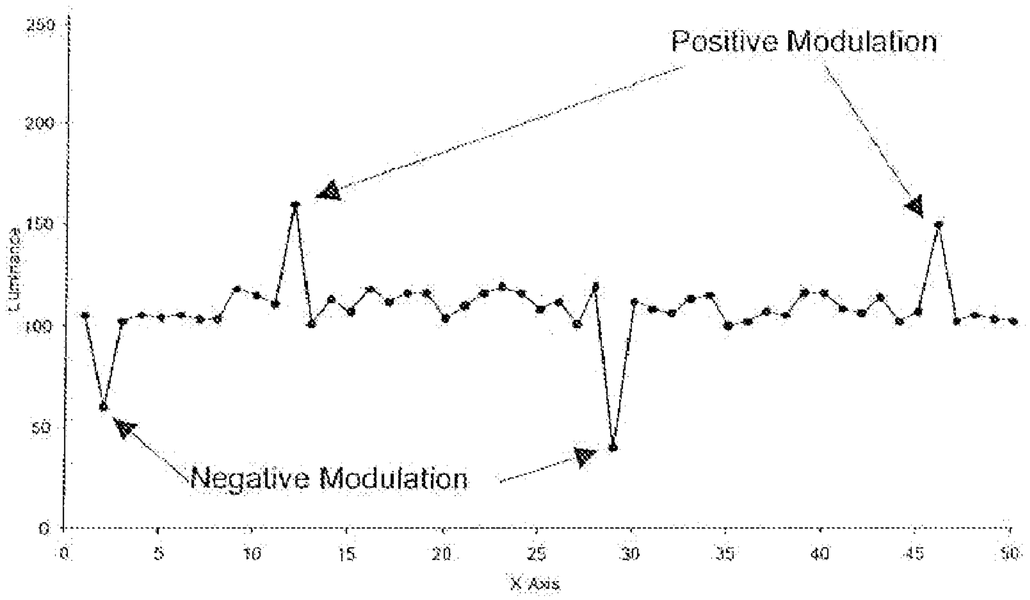
FIG. 1 illustrates an example of a symmetric modulation.

An example of a symmetric modulation is illustrated in FIG. 1. The curve shows the luminance variation of the pixels as a function of the X position and for identical Y position. The four peaks illustrate the effect of a symmetric modulation of this signal obtained through local increase and decrease of the luminance.

Figure 2:
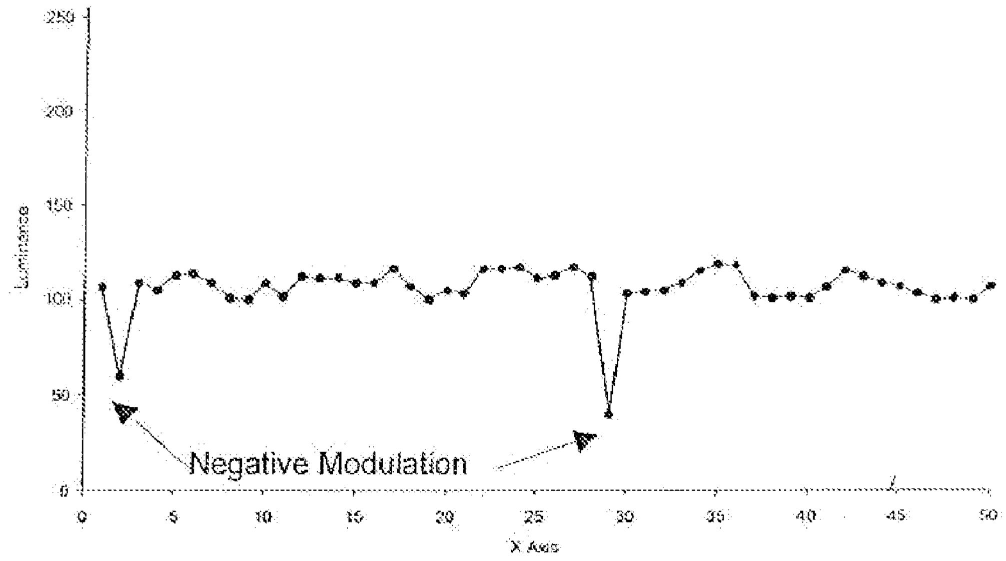
FIG. 2 illustrates an example of an asymmetric modulation.

An example of an asymmetric modulation is illustrated in FIG. 2. The curve shows the luminance variations of the image pixels as a function of the X position and for identical Y position. The two peaks illustrate the effect of an asymmetric modulation of this signal, obtained by only reducing the luminance.

Printing of the Mark

Depending on whether a positive or a negative modulation is used, different approaches can be considered to print an asymmetrically modulated mark. In addition, it is possible to choose either a separate printing or a simultaneous printing together with another visual printed motif (background, text, or graphics).

One way to obtain or positive asymmetric modulation consists in using an overprinting technology where the mark is printed over the colors of the material and other already printed information, and thus without taking into account the local color variations of the colors on the surface of the material. This approach implies that the color components of the material can only be darkened at the time of the signature because additional ink is added. Mathematically speaking this corresponds to a positive asymmetric modulation of the spot colors. In principle, this approach can be applied to any printing process. Some specialties of printing the mark may depend on the printing process. The particular cases of offset and inkjet printing for the realization of a positive modulation are detailed below.

Figure 4:
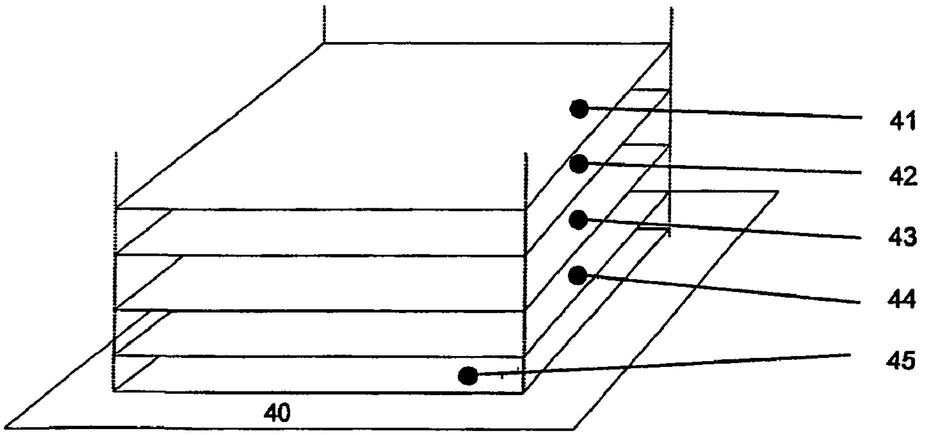
FIG. 4 illustrates the implementation of the process integrated with offset printing technology.

FIG. 4 illustrates the implementation of the above process using a positive modulation with an industrial printing technology of offset type and where the mark is printed simultaneously. In this example a four-color printing 45 (for example for a packaging 40) is used, which means that four different ink colors are used, for each of the masks yellow 41, cyan 42, magenta 43, and black 44. As the digital mark may contain one single color, it is generally desirable to use for the mark one of the colors already selected for the standard printing. FIG. 4 shows how the different masks can be applied. In this case, the printing of the mark is fully integrated in industrial printing chain and does not introduce additional costs. For example, the yellow mask can be used simultaneously for two different things, the yellow component of the image to be printed and the image of the mark. The software tools used during exposure of the offset films easily allow for this integration.

Figure 5:
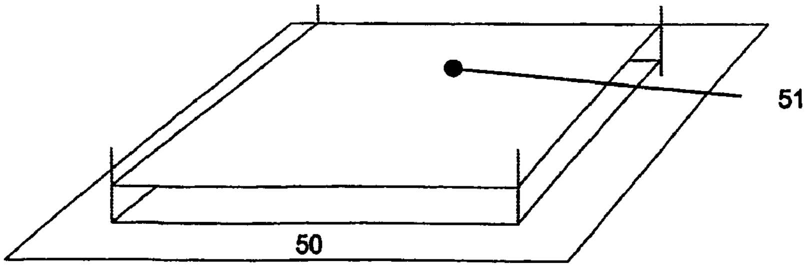
FIG. 5 illustrates the implementation of the process with a separate offset printing step.

A different alternative consists in using a separate mask for the digital mark, as illustrated in FIG. 5. In this case, the digital mark is over-printed in an additional step with its own mask and perhaps with its own color (in this case magenta).

Figure 6:
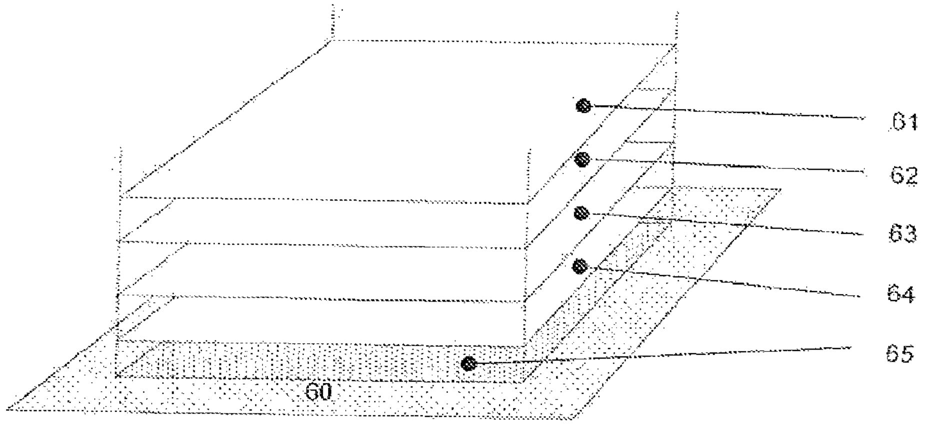
FIG. 6 illustrates the implementation of the process with a separate offset printing step.

The mask 51 defines the points of the digital mark, which are printed over the material previously printed on 50. This method, although more expensive in execution by the printer, has the advantage that the digital mark can be changed more easily during production. For example, this allows applying a digital mark identifying the country of reselling to a batch of packaging. It should be noted that if transparent inks are being used it is also possible to printed the final image is over-printed after the digital mark, as illustrated in FIG. 6. In this case, the process is inversed, that is, first the digital mark is printed 60 on the material and then the final image in an additional step. The masks yellow 61, cyan 62, magenta 63, and black 64 are used to over-print the motif. Because the inks are transparent, the digital mark 60 positioned below the motif can still be detected from the result 65.

Figure 7:
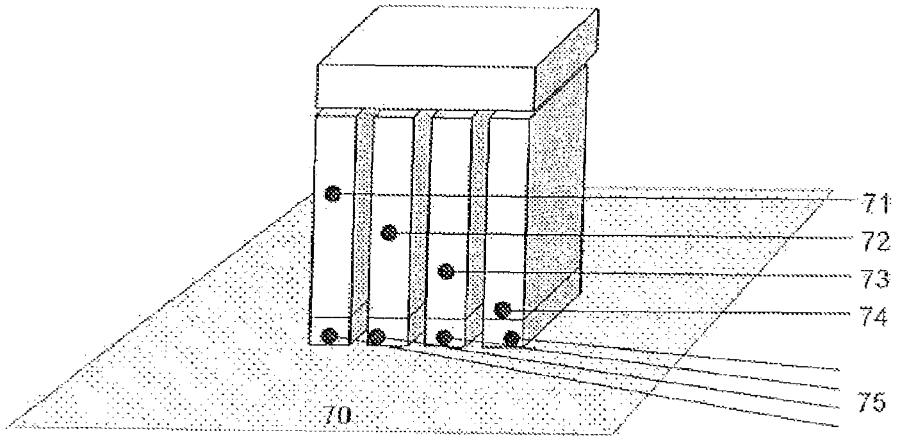
FIG. 7 illustrates the implementation of the process with inkjet printer.

A different printing process that can be used is of type inkjet, as illustrated in FIG. 7. The figure shows an example of an inkjet printing system using four colors yellow 71, cyan 72, magenta 73, and black 74, their printing heads 75, and the printed material 70. The digital mark is over-printed on the material. The usage of an inkjet printer to print a digital mark is particularly simple as a large number of printer drivers take care of the color mixing in a fully automated manner to obtain specific color hues. The step of a four-color decomposition is therefore often not necessary. Nevertheless, it should be noted that depending on the printer drivers it is sometimes advantageous to choose the color of the digital mark as one of the fundamental colors of the printer in order to avoid dithered colors or alignment problems between points of different colors. Similar to the offset printing process, the digital mark can be printed simultaneously with the information or motifs to be printed normally. It is also possible to print the digital mark in a separate step, under or over the final motif. In particular, text can be over printed on a signed material, and the text may eventually be linked to the digital mark. For example, key numbers from a contract can also be hidden in the digital mark to guarantee the integrity.

The realization of a negative modulation can be achieved though a simultaneous printing and following the same principles as described before since it is always possible to subtract color from a digital file: in the motif to be printed, the points corresponding to the mark are lightened. To realize a separated printing with a negative modulation, it is however necessary to use a special ink, for example when using a visible ink, one solution consists in using a covering, that is opaque ink. A synthesis of the different solutions to print a digital mark is presented in the following table:

| | Simultaneous Printing | Separate Printing |
|---|---|---|
| Asymmetric Positive Modulation | Possible | Possible through over-printing or under-printing |
| Modulation | Possible | Possible |

Parameters Controlling the Visibility of the Digital Mark

Independent of the modulation and printing type chosen, the final visibility as well as the fragility to duplication of the digital mark is controlled by a set of the common parameters:

- Point Size: Diameter of the points of the digital mark after printing. The minimum size is determined by the printing technology. Values between 300 and 1200 point per inch are common. The smaller the points, the less visible the digital mark.
- Point Color: Depending on the color, the texture and the printed motifs eventually applied on the materials, cer-

- tain colors result in a less visible digital mark. For example, it is common to use yellow color for white backgrounds (positive modulation with simultaneous or separate printing).
- Mark Density: Defines the ratio of the number of printed points per surface (also measured in points). Typical values of 0.02 or less can be used. A small point size allows for the increase of the density of the mark.
- Ink Quantity: Tuning the visibility with the ink quantity for each point is very interesting if the printing process allows it.
- Dithering: Also known as half-toning technologies allow the reproduction of any color using different fundamental colors. It is therefore preferential that the resolution of the dithering is sufficiently fine with respect to the size of the points.
- Ink Type: It is also possible to use invisible substances.

Figure 3:
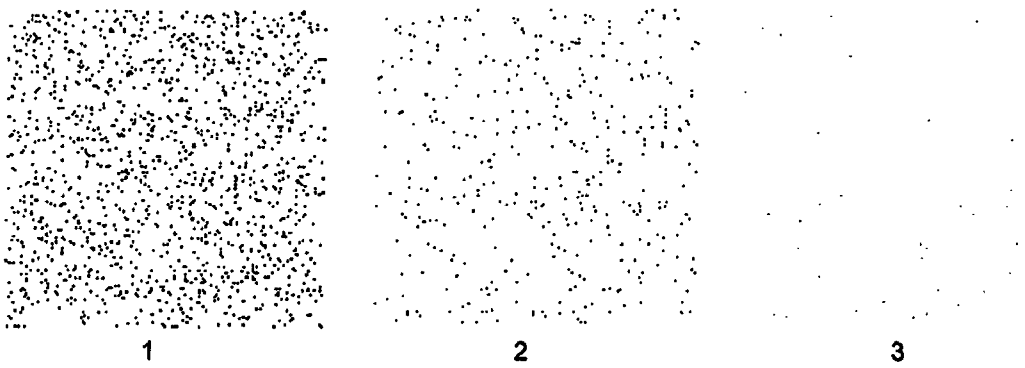
FIG. 3 illustrates examples of an asymmetric mark.

The influence of certain of these parameters is illustrated in FIG. 3. The digital mark 1 is visible. The decreased visibility of the digital mark 2 was obtained by simultaneously decreasing the density and the point size. The digital mark 3 was in addition lightened.

Reading the Mark

The main difficulty relies in retrieving the asymmetric digital mark. In general, the majority of watermarking technologies can extract the information from the signed image without using the original image. Certain methods first compute a prediction of what was the original image from the signed image and can then derive the signature. This technology is still being used at present. It is possible to eliminate this prediction in the case where the material initially has a known uniform color. In particular, this applies for a white sheet of paper. It allows the increase of the reliability of the detection and thus the decrease of the visibility of the digital mark down to the optical sensitivity limit of the scanner. Consequently, it renders duplication of the signed material very difficult, for example through photocopying, because generally the inherent losses of any reproduction system weaken the digital mark below the detection threshold. An application consists in including a digital mark on paper sheets that we want to protect against copying, such as banknotes.

In addition, to increase the detection reliability it is also possible to code the signature by using the difference between pairs of pixels and then compute the average of these differences. From a statistical point of view, this increases the correlation of the detection and results in a more reliable signature.

Realization of the Invention

One way of realizing the invention consists in using as a base a spatial domain digital watermarking algorithm with symmetric amplitude modulation, as for example described in [1]. We refer to a symmetric amplitude modulation of a signal if the values of the signal are increased at some points and decreased at others. In this technique, the color components from a set of pixels c(k) are modified by a value v corresponding to the amplitude of the modulation, a function of the sign of the bit b={−1, 1} to be hidden, and a pseudo-random number generator a(k) initialized by a key and generating two values {−1, 1}:

$$c(k)'=c(k)+v.b.a(k) \tag{1}$$

In equation (1), the set of points defined by v.b.a(k) constitute the digital mark (FIG. 8, step 84) added to the original c(k) and resulting in the signed image c(k)'. It is the latter, which is printed according to the present invention.

In the case of an asymmetric positive modulation (for instance digital mark with over-printing) it is not anymore the image c(k)' but directly the digital mark v.b.a(k) that is printed over an image c(k). The component c of a support (blue, luminance, etc.) already has an initial value o(k) and can only be increase during over-printing. Therefore, the following equation applies:

$$\text{Iff } b.a(k)>0 \text{ then } c(k)'=o(k)+v.b.a(k) \text{ otherwise } c(k)'=o(k) \tag{2}$$

Figure 8:
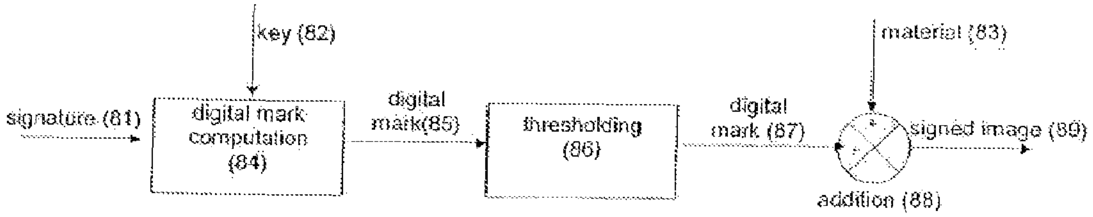
FIG. 8 shows a block diagram of a process to sign a material in three steps.

FIG. 8 shows a block diagram of the full process: the set of the points constituting the digital mark 85 is calculated 84 based on the bit value to be hidden 81 and the digital key 82 defining the pseudo-random sequence a(k). The value of the points can be either negative or positive, as defined in equation (1). Equation (2) is equivalent to thresholding 86 the values of the digital mark 85, keeping only the positive values, and adding 88 the values 87 to the image to be signed 83 to obtain the signed image 89. In comparison with Equation (1), representing a symmetric amplitude modulation with sign b.a(k), the proposed technology is characterized by an <<asymmetric amplitude modulation>>. In addition, as the sign of the modulation b.a(k) is positive, the modulation is referred to as <<positive>>.

In the case where the digital mark deployed simultaneously with the printing, the process can even be improved by operating in such a manner that the digital mark dominates the original mask. Mathematically speaking, this concept can be formalized in the following manner:

$$c(k)'=0 \text{ iff } b.a(k)<0$$

$$c(k)'=M \text{ otherwise}$$

where M is the maximum allowable value of the mask, that is, the value corresponding to the color of the document before signing it. The equation clearly shows the positive modulation with respect to zero and illustrates that the underlying image is not taken into account at the positions where the digital mark is hidden (domination of the digital mark over the original values). This procedure has the advantage that the effective number of points contributing to the digital mark increases and can reach a factor of 2 in the best case.

It is also possible to obtain a negative modulation by printing a uniform color u <<punched>> by the digital mark. Equation (2) then becomes $$\text{Iff } b.a(k)<0 \text{ then } c(k)'=o(k)+u-v.b.a(k) \text{ otherwise } c(k)'=o(k) \tag{3}$$

If the pseudo-random number generator a(k) produces the same number of positive and negative values, then from a statistical point of view it results that half of the pixels c(k) are being modified (in both cases: positive or negative asymmetric modulation). If the value of v is chosen sufficiently small and the printing resolution is sufficiently high, then the points can be produced in an invisible way.

The new values of the points c(k)' can be measured on the printed paper sheet by using an optical scanner. Depending on whether the color of the material is uniform or not, two cases occur.

Figure 9:
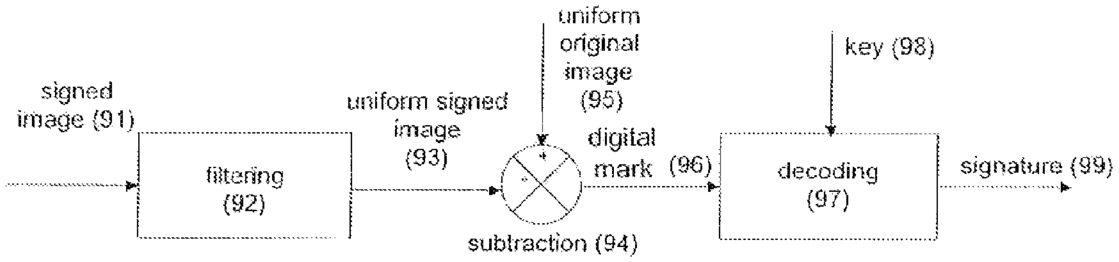
FIG. 9 shows a block diagram of a reading process of a uniform image signed in three steps.

In the first case, the information b is easily found as o(k) =Constant, and both v and a(k) are known in advance. The large number of modified pixels creates a redundancy assuring the robustness to noise of the technology through a statistical correlation. FIG. 9 shows a block diagram describing the process: The signed image obtained through scanning is subtracted from the original image to restore the digital mark. The bit making up the signature is then calculated. Optionally, an additional filtering step can be introduced if visible information was printed over the uniform image signed with a digital mark. The signed image 91 is first filtered 92 in order to eliminate eventual noise (scratches, dirt, text printed over the digital mark, etc.). The resulting image 93 is subtracted 94 from the signed image 95 in order to extract the digital mark 96. The bit values b are afterward found according to traditional digital watermarking methods, as described in [5] M. Kutter, "Watermarking resisting to translation, rotation, and scaling.", *Proceedings of SPIE International Symposium on Voice, Video, and Data Communications*, November 1998. The method mainly consists in inverting Equation (2) and statistically correlating the value of the found bit b 99 over several pixels k in order to guarantee a good robustness to possible errors introduces for example during the digital acquisition of the image.

This method can be generalized to several bits b to code any digital information, such as a number or a string of characters.

Figure 10:
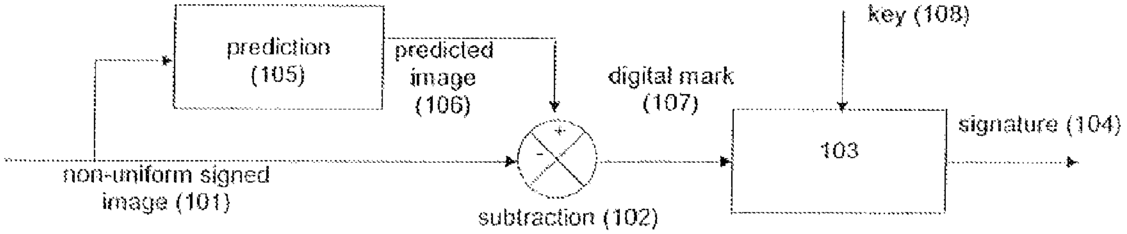
FIG. 10 shows a block diagram of a reading process of a non-uniform image signed in three steps.

The second case is illustrated in the block diagram of FIG. 10: the original image is predicted from the signed image, the signed image is then subtracted from the predicted image to restore the digital mark and calculate the bit making up the signature. A denoising filter 105, for example a Wiener filter, is used to compute the prediction 106 of the original image o(k) from the signed image 101. The difference 102 between the two images is the digital mark 107 from which we can decode 103 the bit 104 by deploying to the same method as before and using the key 108 (FIG. 9). As the prediction error is more significant as in the first case, the number of bits that can be coded in this manner is systematically inferior.

In practice, it can also be useful to print visible information over the digital mark. This is for example the case for a white paper sheet containing a digital mark and on which text is printed. This can be realized by choosing distinct colors or intensities for the digital mark and the visual information. It is then possible to filter the image before detecting the digital mark (FIG. 9, step 92) in order to differentiate between digital mark and the printed text and eliminate the parts not containing the digital mark. One possibility consists in using the blue component for the digital mark and printing the text of the document in black.

Finally, the realization of the detection requires an optical scanner capable of digitizing the document on which the digital mark is printed. As the positioning of the document on the scanner is never perfect, it is necessary to be able to detect the information coded in the digital mark even after eventual translations and rotations.

One suitable method consists in using the method described in [5], which is based on an auto-correlated digital mark (to compensate for rotations) and a method the cross-correlation (to compensate for translations).

Other Applications

The process can also be applied to other sectors than printing. For instance, it is possible to use laser engraving to apply a digital mark to metallic surfaces, stone, ceramics, etc. Applications addressed are for example industrial parts for the automobile and aeronautic industry, luxury objects in the sectors of jewelries, or value object. One can also imagine hiding digital marks on CD-ROMs or audio CDs, on both the label surface and the engraving side (ink or laser).

The invention claimed is:

1. A method for depositing a digital mark on a printed or engraved surface, the digital mark containing digital information in encoded form, the method comprising the steps of:

generating the digital mark by selecting at least one set of pixels having a point size at least as small as 300 dots per inch;

initializing a pseudo random number generator with a key and with the digital information;

generating an output from the pseudo random number generator initialized by the key and the digital information; and modifying the set of pixels according to the output of a pseudo random number generator such that each pixel in the set of pixels that corresponds to a bit in the output of the pseudorandom number generator having a first value is modified, and each pixel in the set of pixels that corresponds to a bit in the output of the pseudorandom number generator having a second value is not modified;

printing a visual element on the surface, the visual element not including the digital mark; and overprinting the digital mark on the surface after the visual element has been printed on the surface without taking into account any local color variations of the surface such that the luminosity of the surface is decreased, the digital mark being detectable on the printed or engraved surface, but the digital mark not being detectable in a copy of the printed or engraved surface when the printed or engraved surface is reproduced.

2. The method of claim 1, wherein the digital mark has a point color close to a color of the surface.

3. A printed or engraved surface having a digital mark deposited thereon in accordance with the method of claim 2.

4. A printed or engraved surface having a digital mark deposited thereon in accordance with the method of claim 1.

5. The surface of claim 4, wherein the mark is deposited using ink and has a resolution and a color such that the mark is not visible to the naked eye under natural light.

6. A printed or engraved surface having a digital mark deposited thereon in accordance with the method of claim 1.

7. The method of claim 1, wherein the overprinting step is performed using a separate mask for the digital mark.

8. The surface of claim 7, wherein the surface has a uniform color prior to deposit of the digital mark.

9. A printed or engraved surface having a digital mark deposited thereon in accordance with the method of claim 7.

10. A method for depositing a digital mark on a printed or engraved surface, the digital mark containing digital information in encoded form, the method comprising the steps of:

generating the digital mark by selecting at least one set of pixels having a point size at least as small as 300 dots per inch;

initializing a pseudo random number generator with a key and with the digital information;

generating an output from the pseudo random number generator initialized by a key and the digital information;

modifying the set of pixels according to the output of the pseudo random number generator such that each pixel in the set of pixels that corresponds to a bit in the output of the pseudorandom number generator having a first value is modified and each pixel in the set of pixels that corresponds to a bit in the output of the pseudorandom number generator having a second value is not modified; and overprinting the digital mark on the surface without taking into account any local color variations of the surface such that the luminosity of the surface is decreased, the digital mark being detectable on the printed or engraved surface, but the digital mark not being detectable in a copy of the printed or engraved surface when the printed or engraved surface is reproduce;

wherein no visual element is deposited on the surface prior to the overprinting step.

11. The method of claim 10, further comprising the step of printing a visual element on the surface after the overprinting step is performed.

12. The method of claim 10, wherein the digital mark has a point color close to a color of the surface.

13. A printed or engraved surface having a digital mark deposited thereon in accordance with the method of claim 12.

14. The method of claim 10, wherein the overprinting step is performed using a separate mask.

* * * * *